J. M. MEEKINS.
TWIN SIGNAL ELECTRIC LAMP.
APPLICATION FILED APR. 6, 1916.
1,277,983.
Patented Sept. 3, 1918.
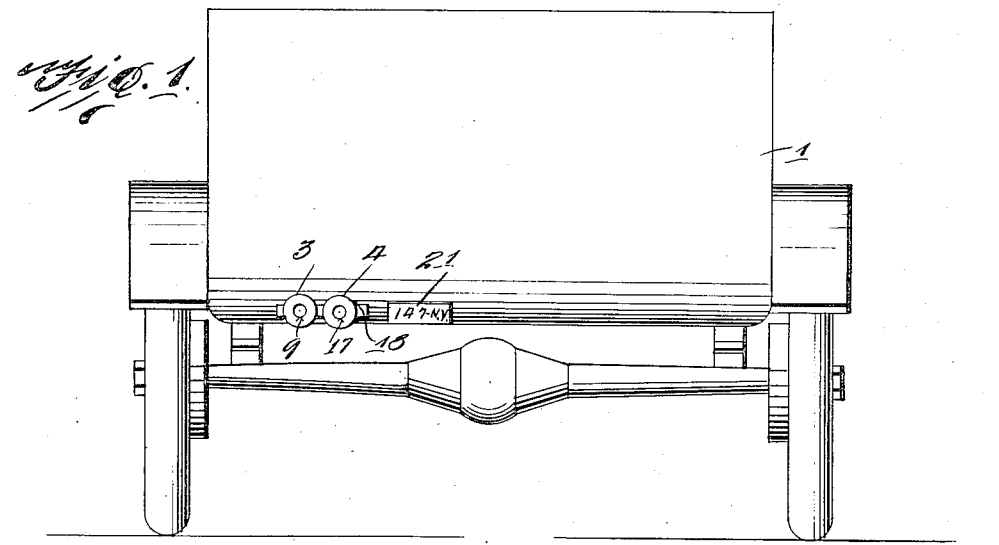
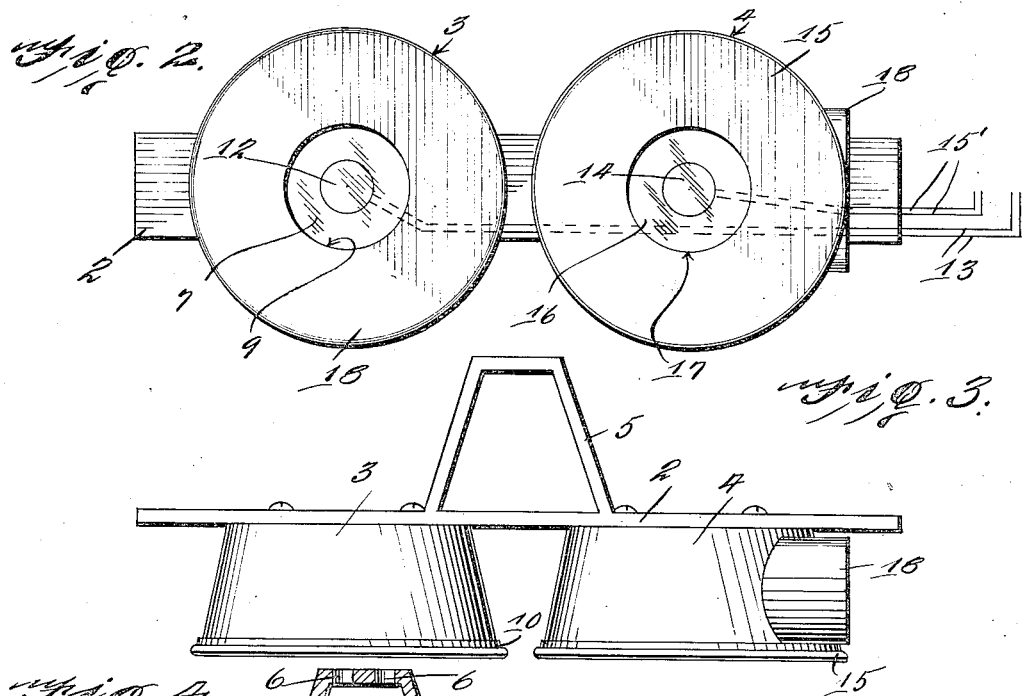
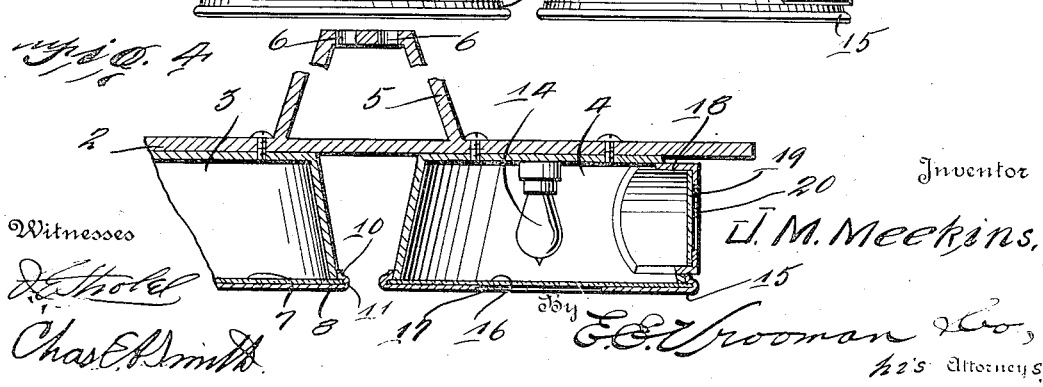
Witnesses
Inventor
J. M. Meekins,

UNITED STATES PATENT OFFICE.

JEREMIAH M. MEEKINS, OF BALTIMORE, MARYLAND, ASSIGNOR OF ONE-HALF TO WILLIAM H. GAHAN, OF BALTIMORE, MARYLAND.

TWIN SIGNAL ELECTRIC LAMP.

1,277,983.     Specification of Letters Patent.     Patented Sept. 3, 1918.

Original application filed August 31, 1915, Serial No. 48,286. Patent No. 1,202,870, dated October 31, 1916. Divided and this application filed April 6, 1916. Serial No. 89,431.

*To all whom it may concern:*

Be it known that I, JEREMIAH M. MEEKINS, a citizen of the United States of America, residing at Baltimore, in the State of Maryland, have invented certain new and useful Improvements in Twin Signal Electric Lamps, of which the following is a specification, reference being had therein to the accompanying drawing.

This invention relates to signals for automobiles and has special reference to a lamp housing adapted to be carried by the automobile so as to efficiently display a signal for advising the following automobile as to the change of direction of travel, or as to its coming to a stop.

Another object of this invention is the production of a simple and efficient lamp housing which may be easily and conveniently supported upon an automobile in any desired position for giving the desired signals, and also for efficiently lighting the number thereof.

A still further object of this invention is the production of a simple and efficient lamp housing which may be cheaply manufactured.

Other objects and advantages of the present invention will appear throughout the following specification and claim.

In the accompanying drawing:—

Figure 1 is a rear side elevation of an automobile showing the signal applied thereto.

Fig. 2 is a rear elevation of the signal lamp housings.

Fig. 3 is a top plan view of the lamp housings showing the electrical wiring for lighting the lamps mounted therein.

Fig. 4 is a horizontal section through a portion of the lamp housing.

By referring to the drawing it will be seen that 1 designates the automobile or other vehicle to which the signal may be attached. A lamp supporting bracket 2 is adapted to support the lamp housings 3 and 4 as illustrated clearly in Fig. 3 of the drawing. The bracket 2 is provided with a substantially V-shaped rearwardly extending portion 5 which is provided with a plurality of apertures 6 at the rear thereof for the purpose of permitting securing means such as screws and the like to pass therethrough and secure the bracket to the body of an automobile.

The lamp housings 3 and 4 are riveted or otherwise secured to the supporting arms of the bracket as illustrated clearly in Fig. 3.

The lamp housing 3 comprises a substantially circular body which flares outwardly at its outer end and carries a glass or transparent plate 7, preferably being colored green. A retaining cap 8 is mounted upon the outer end of the lamp housing 3 and is provided with a circular aperture 9 for the purpose of allowing the light to shine from the lamp housing 3. The cap 8 is provided with a rearwardly rolled periphery 10, which is provided, as illustrated in Fig. 4, with an off-set socket 11 around the edge thereof for the purpose of receiving the edge of the glass plate 7 and firmly holding the same in engagement with the outer edge of the lamp housing 3, thereby insuring the glass plate against rattling which would be likely to cause the same to break. A light 12 is mounted within the lamp housing 3 as illustrated in Fig. 2, and this light is electrically connected to supply wires 13 as illustrated in Fig. 2. The lamp housing 4 also carries a lamp 14 which is electrically connected to the lighting wires 15', the circuits for lighting the wires being closed such as illustrated and described in connection with my previous application bearing Serial Number 48,286, filed August 31, 1915, now Patent 1,202,870, dated Oct. 31, 1916, the present application being a division from my previous application above identified.

The housing 4 flares slightly outwardly toward the outer end thereof and receives a plate retaining cap 15. A glass plate 16 is carried by the retaining cap 15 and is preferably red in color, the retaining cap 15 being provided with a centrally located aperture 17. The cap 15 is similarly constructed to the cap 11 so as to efficiently hold the glass plate 16 in engagement with the lamp housing 4.

A laterally extending nozzle or collar 18 is carried upon one side of the lamp housing 4 and carries a glass plate 19, the nozzle 18 being provided with a centrally located aperture 20 for the purpose of throwing the light upon the license number 21 adapted to be supported in the rear of the vehicle 1.

Having thus described the invention what is claimed as new, is:—

As a new article of manufacture, a device for signaling upon an automobile, comprising a straight one-piece bracket having a rearwardly-extending, integral member, said rearwardly-extending member comprising a straight outer portion parallel with said one-piece bracket, said outer portion provided with a pair of apertures, and said rearwardly-extending member provided with diverging sides, said rearwardly-extending member formed on said bracket at its center, a pair of circular lamp-housings engaging the front face of said bracket, screws extending through said bracket and into said lamp-housings, detachably securing said housings to said bracket, said housings secured to the bracket contiguous to the diverging sides of said rearwardly-extending member, a cap secured to the outer end of each housing, said cap provided with a centrally-located circular opening, a color-plate carried by the outer end of said housing and fitting snugly against the inner face of said cap, said cap provided with a circular socket around the periphery thereof for permitting the resting of said color-plate therein, whereby the edge of said color-plate is held within said circular socket against the outer edge of said lamp housing, and illuminating means positioned within said lamp-housing.

In testimony whereof I hereunto affix my signature.

JEREMIAH M. MEEKINS.